(12) United States Patent
Zubrin

(10) Patent No.: US 11,077,963 B2
(45) Date of Patent: Aug. 3, 2021

(54) DIPOLE DRIVE FOR SPACE PROPULSION

(71) Applicant: Pioneer Astronautics, Lakewood, CO (US)

(72) Inventor: Robert M Zubrin, Golden, CO (US)

(73) Assignee: Pioneer Astronautics, Lakewood, CO (US)

(*) Notice: Subject to any disclaimer, the term of this patent is extended or adjusted under 35 U.S.C. 154(b) by 79 days.

(21) Appl. No.: 16/298,970

(22) Filed: Mar. 11, 2019

(65) Prior Publication Data
US 2020/0024005 A1 Jan. 23, 2020

Related U.S. Application Data

(60) Provisional application No. 62/641,973, filed on Mar. 12, 2018.

(51) Int. Cl.
*B64G 1/40* (2006.01)
*F03H 1/00* (2006.01)

(52) U.S. Cl.
CPC ............ *B64G 1/405* (2013.01); *B64G 1/407* (2013.01); *F03H 1/0037* (2013.01)

(58) Field of Classification Search
CPC ...... F03H 1/0037; F03H 99/00; F03H 1/0043; B64G 1/405
See application file for complete search history.

(56) References Cited

U.S. PATENT DOCUMENTS

2016/0040658 A1* 2/2016 Krauss .................. F03H 1/0018
60/202

OTHER PUBLICATIONS

Drew Brisbin "Spacecraft With Interstellar Medium Momentum Exchange Reactions", Apr. 2019, JBIS (Journal of British Interplanetary Society) "General Interstellar Issue" vol. 4 (Year: 2019).*
Wikipedia "Solar Sail" (Year: 2020).*
Pekka Janhunen, "Electric Sail for Spacecraft Propulsion," J. Propulsion, vol. 20, No. 4: Technical Notes, pp. 763-764. 2004.
Robert Zubrin, "Dipole Drive for Space Propulsion," JBIS, vol. 70, No. 12, pp. 442-448, Dec. 2017. Also see https://www.centauri-dreams.org/2018/06/29/the-dipole-drive-a-new-concept-for-space-propulsion/.
D. G. Andrews and R. Zubrin, "Magnetic Sails and Interstellar Travel", IAF-88-553, 1988.

(Continued)

*Primary Examiner* — Arun Goyal
*Assistant Examiner* — William L Breazeal
(74) *Attorney, Agent, or Firm* — Starfort IP; John T Henri

(57) ABSTRACT

The dipole drive is a new propulsion system which uses ambient space plasma as propellant, thereby avoiding the need to carry any of its own. The dipole drive is constructed from two parallel screens, one charged positive, the other negative, creating an electric field between them with no significant field outside. Ambient solar wind protons entering the dipole drive field from the negative screen side are reflected out, with the angle of incidence equaling the angle of reflection, thereby providing lift if the screen is placed at an angle to the plasma wind. Protons entering from the positive side are accelerated out the negative screen, producing thrust. The dipole drive can achieve more than 3 mN/kWe in interplanetary space and better than 10 mN/kWe in Earth, Venus, Mars, or Jupiter orbit and offers potential as a means of achieving ultra-high velocities necessary for interstellar flight.

12 Claims, 1 Drawing Sheet

(56) References Cited

OTHER PUBLICATIONS

R. Zubrin and D.G Andrews, "Magnetic Sails and Interplanetary Travel," AIAA-89/2441, AIAA/ASME Joint Propulsion Conference, Monterey, CA Jul. 1989. Published in Journal of Spacecraft and Rockets, Apr. 1991.
"Debye Length," Plasma Universe.com, https://www.plasma-universe.com/Debye_length accessed Feb 18, 2018.
Robert Zubrin, "The Dipole Drive: A New Concept in Propellantless Propulsion," IAC-19,C3,5-C4.7,9,x48804 Presented at the International Astronautical Congress, Washington, DC Oct. 2019. http://www.pioneerastro.com/wp-content/uploads/2019/10/The-Dipole-Drive-A-New-Concept-in-Propellantless-Propulsion.pdf.
Geoff Landis, "Comment on the Dipole Drive," JBIS vol. 73 No. 1—Jan. 2020—pp. 4-5.
Robert Zubrin, "Response to Geoff Landis's Comment on the Dipole Drive," JBIS vol. 73 No. 1—Jan. 2020—pp. 4-5.

\* cited by examiner

DIPOLE DRIVE FOR SPACE PROPULSION

RELATED APPLICATIONS

This application claims the benefit of U.S. Provisional application No. 62/641,973 titled "Dipole Drive for Space Propulsion" filed Mar. 12, 2018 which is incorporated herein by reference.

BACKGROUND

The performance of rockets as propulsion systems is greatly limited by their need to carry onboard propellant, which adds to the mass which must be propelled exponentially as the extent of propulsive maneuvers is increased. For this reason, engineers have long been interested in propulsion systems that require no propellant.

The best known propellantless system is the solar sail, which derives its thrust by reflecting light emitted by the Sun. Solar sails are limited in their performance however, by their dependence upon sunlight, which decreases in strength with the square of the distance, and the laws of reflection, which dictate that the direction of thrust can only lie within 90 degrees of the vector of sunlight. Moreover, because photons move so swiftly, the amount of thrust than can be derived be reflecting light is at best 0.0067 mN/kW (at 100% reflectance, full normal incidence), which means that very large sails, which necessarily must have significant mass and be difficult to deploy, must be used to generate appreciable thrust. As a result, while solar sails have been studied since the time of Tsiolokovsky[1], they have yet to be used in space.

An alternative to the solar sail is the magnetic sail, or magsail, which was first proposed by Zubrin and Andrews in 1988, and subsequently analyzed extensively by them in a variety of further papers[2,3] in the 1990s. The magnetic sail uses a loop of superconducting wire to generate a magnetosphere to deflect the solar wind. Assuming the development of high temperature superconducting wire with the same current density as existing low temperature superconductors, a magsail should be able to generate significantly higher thrust to weight than is possible with solar sails. However such wire has yet to be developed.

Another propellantless propulsion system of interest is the electric sail[4], which like the magsail operates by deflecting the solar wind, in its case by using an electrostatic charge. As a result, like the magsail, the classic electric sail (electric sail) cannot operate inside of a planetary magnetosphere other than as a drag device, has its thrust decrease with distance from the Sun, and is limited in the potential direction of its thrust. Because of the low momentum density of the solar wind, electric sails must be even bigger than solar sails. However, because only sparsely space thin wires are needed to create sail area, higher thrust to mass ratios can be achieved than are possible using solar sails which require solid sheets of aluminized plastic.

Electrodynamic tethers[5] have also been proposed, which use the interaction of a current in a tether with the Earth's geomagnetic field to produce thrust. In addition to facing a variety of engineering and operational issues, however, such systems can only operate in a planetary magnetic field and can only thrust in a direction normal to the field lines, a consideration which limits their applicability.

Finally, we note recent claims for a system called the EM Drive[6], which according to its proponents can generate about 1 mN/kWe, in any direction, without the use of propellant, an external light source or plasma wind, or magnetic field. Such performance would be of considerable interest. However, as it appears to contradict the laws of physics, there is reason to suspect that the measurements supporting it may be erroneous.

As a result, there clearly remains a need for a new type of propellantless propulsion system, which can operate both inside and outside of a planetary magnetosphere, can thrust in a multitude of directions, and which is not dependent upon sunlight or the solar wind as a momentum source. The dipole drive is such a system.

DETAILED DESCRIPTION OF THE INVENTION

The dipole drive is a new propulsion system which uses ambient space plasma as propellant, thereby avoiding the need to carry any of its own. The dipole drive remedies two shortcomings of the classic electric sail in that it can generate thrust within planetary magnetospheres and it can generate thrust in any direction in interplanetary space. In contrast to the single positively charged screen employed by the electric sail, the dipole drive is constructed from two parallel screens, one charged positive, the other negative, creating an electric field between them with no significant field outside. Ambient solar wind protons entering the dipole drive field from the negative screen side are reflected out, with the angle of incidence equaling the angle of reflection, thereby providing lift if the screen is placed at an angle to the plasma wind. If the screen is perpendicular to the solar wind, only drag is generated but the amount is double that of electric sail of the same area. To accelerate within a magnetosphere, the positive screen is positioned forward in the direction of orbital motion. Ions entering are then propelled from the positive to the negative screen and then out beyond, while electrons are reflected. There are thus two exhausts, but because the protons are much more massive than the electrons, the thrust of the ion current is more than 42 times greater than the opposing electron thrust, providing net thrust. To deorbit, the negative screen is positioned forward, turning the screen into an ion reflector. The dipole drive can achieve more than 3 mN/kWe in interplanetary space and better than 10 mN/kWe in Earth, Venus, Mars, or Jupiter orbit. In contrast to the electric sail, the ultimate velocity of the dipole drive is not limited by the speed of the solar wind. It therefore offers potential as a means of achieving ultra-high velocities necessary for interstellar flight.

Figure 1:
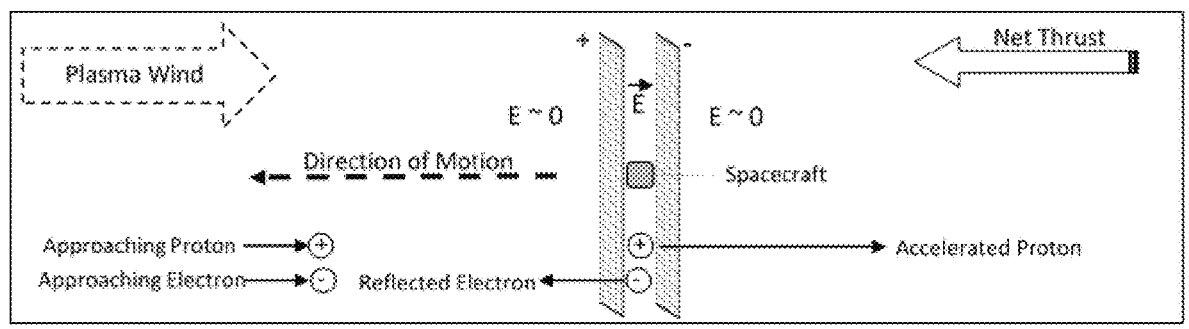
FIG. 1 shows the dipole drive accelerating within a magnetosphere.

The principle of operation of the dipole drive while accelerating a spacecraft within a planetary magnetosphere is illustrated in the FIG. 1.

In FIG. 1 we see two parallel screens, with the one on the left charged positive and the one on the right charged negative. There is thus an electric field between them, and effectively no field outside of them, as on the outside the field of each screen negates the other. There is also a voltage drop between the two, which for purposes of this example we will take to be 64 volts.

Protons entering the field region from the left are accelerated towards the right and then outward through the right-hand screen, after which they escape the field and experience no further force. Protons entering from the right are reflected towards the right, adding their momentum to that generated by the protons accelerated from left to right. There is thus a net proton current from left to right, and a net proton thrust towards the left.

In the case of electrons, the situation is exactly the opposite, with a net electron current from right to left, and a net electron thrust towards the right. Note that while electrons entering from the right will be greatly accelerated by the field, reflected electrons will only be reflected with their initial velocity. There will also be an electron current through the outside plasma to neutralize the net proton flow to the right.

Because space plasmas are electrically neutral, the number density of both electrons and ions (which for the moment we will consider to be protons, but may which—advantageously—be heavier species, as we shall discuss later.) will be the same, so the proton and electron electrical currents will be equal, as will the power associated with each of them. However because the mass of a proton is about 1840 times as great as the mass of an electron, the thrust of the proton current will be about 43 times a greater than the opposing electron current thrust, and the system will generate a net thrust. The acceleration of the electrons is a form of drag, to energy for which is provided by loss of spacecraft kinetic energy. It therefore could, in principle be used to generate electric power, partially compensating for the power consumed to accelerate the protons. In the following examples, however, we will assume that there is no provision for doing this, i.e. that the efficiency of any such energy recovery is zero.

To see what the performance of a dipole drive might be, let us work an example, assuming a 500 W power source to drive the system. The electron current negates about 2% of the thrust produced by the proton current. The maximum possible jet power is thus about 490 Wj. Assuming additional inefficiencies, we will round this down to 400 Wj, for a total system electrical to jet power efficiency of 0.8.

A Coulomb of protons has a mass of 0.011 milligrams. If the jet power is 400 W, and the potential difference is 64 V, so the proton current will be 6.25 A, and have a mass flow of 0.0652 mg/s.

The relationship of jet power (P) to mass flow (m) and exhaust velocity (c) is given by:

$$P = \underline{m}c^2/2 \quad (1)$$

Taking P=400 W and $\underline{m}$=0.0652 mg/s, we find that c=110,780 m/s. Since thrust (T) is given by T=$\underline{m}$c, we find:

$$T = \underline{m}c = 7.2 \text{ mN}. \quad (2)$$

This is a rather striking result. It will be recalled that the electrical power driving this system is 500 W. So what we are seeing here is thrust to power ratio of 14.4 mN/kWe, more than ten times better than that claimed for the EM Drive, but done entirely within the known laws of physics!

If it is desired to deorbit (decelerate) a spacecraft, the direction of the screens would be reversed, with the negative screen leading in the direction of orbital motion. In this case, the screens would become a proton reflector. An electric sail could also be used as a drag device to serve the same purpose. However, because the dipole drive doesn't merely create drag against passing protons, but reflects them, it would create twice the drag of an electric sail of the same area. If the dipole drive is positioned obliquely to the wind angle, it can reflect protons, with the angle of incidence equaling the angle of reflection. For example, if it is tilted 45 degrees to the wind, a force will be generated perpendicular to the wind, that is "lift" will be created. Such maneuvers could also be done with the dipole drive in acceleration mode, deflecting protons to combine lift with thrust. Using this capability, a dipole drive propelled spacecraft in orbit around a planet could execute inclination changes.

To summarize, in contrast to the electric sail which can only create drag against the wind to lower its orbit, the dipole drive can thrust in any direction, raising or lowering its orbit or changing its orbital inclination. In addition, when used as a drag device, the dipole drive can create twice the drag per unit area as the electric sail.

The Dipole Drive in Planetary Orbit

Let us therefore analyze the system further. The dipole drive exerts no field outside of its screens, so the only plasma it collects is the result of its own motion through the surrounding medium. So how big does its screen need to be?

We consider first the case of the above described dipole drive system operating in LEO at an altitude of 400 km, being used to thrust in the direction of orbital motion. It is moving forward at an orbital velocity of 7760 m/s. The average density of ions at this altitude is about 1,000,000 per cc. Assuming (conservatively) that all the ions are protons, the required ion mass flow of 0.0652 mg/s would be swept up by a screen with a radius of 127 m.

It may be noted however, that at 400 km altitude there are also O+ions, each with a mass 16 times that of a proton, with a numerical density of about 100,000/cc. These therefore more than double the ion mass density provided by the protons alone. If these are taken into account, the required scoop radius would drop to about 80 m.

Another way to reduce the scoop size would be by going to higher voltage, so that more power can be delivered to a smaller number of ions. If, for example, we quadrupled the voltage to 256 volts, the exhaust velocity would double, to 222 km/s, allowing us to cut the mass flow by a factor of four, and the scoop radius by a factor of two, to just 40 m. The thrust, however, would be cut in half, giving us 3.6 mN/kWe.

As we go up in altitude, the plasma density decreases, as does the orbital velocity, requiring us to go to larger scoops. Examples of 500 W dipole drive systems operating at a variety of altitudes are provided in Table 1. In Table 1, Vo and C are orbital velocity and exhaust velocity, in km/s.

TABLE 1

Dipole Drive Systems Operating in Earth Orbit (Power-500 W)

| Altitude (km) | ion density/cc | Volts | Vo | C | Thrust (mN) | Screen Radius (m) |
|---|---|---|---|---|---|---|
| 400 | 1,000,000 | 1 | 7.8 | 14 | 57.6 | 640 |
| 400 | 1,000,000 | 4 | 7.8 | 28 | 28.8 | 320 |
| 400 | 1,000,000 | 16 | 7.8 | 56 | 14.4 | 160 |
| 400 | 1,000,000 | 64 | 7.8 | 111 | 7.2 | 80 |
| 400 | 1,000,000 | 256 | 7.8 | 222 | 3.6 | 40 |
| 400 | 1,000,000 | 1024 | 7.8 | 444 | 1.8 | 20 |
| 700 | 100,000 | 64 | 7.5 | 111 | 7.2 | 288 |
| 700 | 100,000 | 256 | 7.5 | 222 | 3.6 | 144 |
| 700 | 100,000 | 1024 | 7.5 | 444 | 1.8 | 72 |
| 1000 | 50,000 | 64 | 7.35 | 111 | 7.2 | 410 |
| 1000 | 50,000 | 256 | 7.35 | 222 | 3.6 | 205 |
| 1000 | 50,000 | 1024 | 7.35 | 444 | 1.8 | 103 |

It can be seen that the dipole drive is a very attractive system for maneuvering around from LEO to MEO orbits, as the high ion density makes the required scoop size quite modest. It should be emphasized that the above numbers are for a 500 W system. If a 5 W dipole drive thruster were employed by a microsatellite, the required scoop areas would be reduced by a factor of 100, and the radius by a factor of 10.

It may be noted that Mars, Venus and Jupiter all have ion densities in low orbit comparable to those above. For example, Mars has 500,000/cc at 300 km, Venus has 300,000/cc at 150 km, and Jupiter has 100,000/cc at 200 km, making the dipole drive attractive for use around such planets as well. Many of the moons of the outer planets also have ionospheres, and the dipole drive should work very well in such environments.

As one ascends to higher orbits, the density of ions decreases dramatically, while the orbital speed decreases as well. For example, in GEO, the ion density is only about 20/cc, while the orbital velocity is 3 km/s. These two factors combine to make much larger scoops necessary. So, for example, in GEO, a 500 W dipole drive operating at 1024 volts would need a scoop 3.6 km in radius.

Because the effectiveness of the dipole drive decreases at higher altitudes while operating within the magnetosphere, the best way for a dipole drive propelled spacecraft to escape the Earth is not to continually thrust, as this would cause it to spiral out to trans GEO regions where it would become ineffective. Rather, what should be done is to only employ it on thrust arcs of perhaps 30 degrees around its perigee, delivering a series of perigee kicks that would raise its apogee on the other side of its orbit higher and higher until it escaped the magnetosphere and became able to access the solar wind.

The Dipole Drive in Interplanetary Space

The dipole drive can also operate in interplanetary space. Compared to planetary orbit, the ion densities are lower, but this is partially compensated for by much higher spacecraft velocities relative to the plasma wind. As a result, the required scoop sizes are increased compared to planetary orbital applications, but not by as much as considerations of ion density alone might imply.

Figure 2:
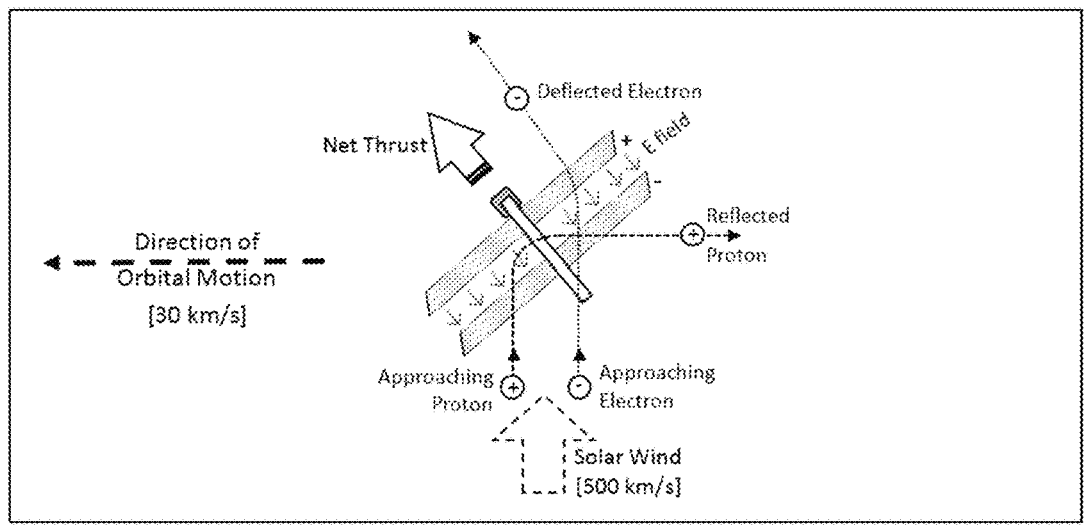
FIG. 2 illustrates a dipole drive operating as a sail in interplanetary space.

Let us consider the case of a dipole drive traveling in heliocentric space at 1 AU, positioned at an angle of 45 degrees to the wind, with its negative screen on the sunward side. It would thus reflect solar wind protons 90 degrees, thereby accelerating itself forward in the direction of orbital motion. A diagram showing the dipole drive operating as a sail in interplanetary space is shown in in FIG. 2.

The solar wind has a velocity of 500 km/s, so to insure reflection, we employ a voltage of 2028 volts, sufficient to reverse the motion of a proton moving as fast as 630 km/s. With a density of 6 million protons be cubic meter, the wind has a dynamic pressure of 1.25 nN/m$^2$. As the sail is positioned 45 degrees obliquely to the wind, its effective area will be reduced by a factor of 0.707, with the thrust reduced to 0.9 nN/m$^2$. In this case, virtually all of the protons hitting the sail will be coming from the sunward side, and since they are reflected without adding any kinetic energy, no power is required to drive them. However, we still have an electron current coming from the sunward side being accelerated outward. This requires power. With 500 W, total radial thrust would be 1.27 mN, with 1.27 mN also delivered in the direction of orbital motion, for a L/D ratio of 1. The total effective screen area would therefore need to be 1,414,000 m$^2$, with an actual area of 2,000,000 m$^2$, requiring a radius of 798 m. Total thrust to power would be 3.6 mN/kWe.

If instead we had not concerned ourselves with obtaining complete deflection of each particle, we could have used a lower voltage. This would increase the thrust per unit power, but increase the required sail area for a given amount of thrust. So, for example, if we chose 512 volts, we would have a total thrust of 3.6 mN, but need a sail radius of 1127 m.

It may be noted that all of these results are for a 500 W dipole drive. A microsatellite might employ a 5 W dipole drive, in which case the required scoop radii would drop by a factor of 10.

Use of the Dipole Drive for Interstellar Flight

In contrast to the electric sail, the dipole drive can be used to accelerate a spacecraft at velocities greater than that of the solar wind. For example, consider a spacecraft moving away from the Sun at a velocity of 1000 km/s. The solar wind is following it at a velocity of 500 km/s, so relative to the spacecraft there is a wind moving inward towards the sun at a velocity of 500 km/s. In this case, to accelerate the spacecraft would direct its positive screen away from the sun. This would cause it to accelerate protons sunward, while reflecting electrons outward, for a net outward thrust. At 500 km/s the protons are approaching the spacecraft with a kinetic energy equal to 1300 volts. It can be shown that employing a screen voltage difference that is equal to triple the kinetic voltage produces maximum thrust for a given amount of power. If we add 3900 volts to the incoming protons, quadrupling their energy, we will double their velocity relative to the spacecraft, thereby providing an effective exhaust velocity of 500 km/s. The solar wind has a density of 6 million protons/m$^3$ at 1 AU, with ambient density decreasing to 1 million/m$^3$ in interstellar space. If we take the former value, we get a thrust of (1.67e-27 kg/proton)(500,000 m/s)$^2$(6,000,000/m$^3$)=2.5 nN/m$^2$. If we take the latter value, it would be 0.42 nN/m$^2$. The proton current at the smaller value would be 80 nA/m$^2$, which at 3900 volts works out to 0.312 mW/m$^2$. The thrust to power ratio would therefore be 1.35 mN/kW. (This ratio would also hold true at the 1 AU value, but the magnitudes of both the thrust and power per unit area would be six times greater.)

If dipole drive powered spacecraft were receding 500 km/s directly away from the Sun, it would see no relative wind and thus produce no thrust. However, like a modern sailboat that can sail faster crosswind than downwind, because it can generate lift, the dipole drive can get to speeds above 500 km/s by sailing across the wind. As the spacecraft's crosswind speed increases, it becomes advisable to turn the sail to ever greater angles to the solar wind and increasingly normal to the crosswind. As this occurs, the L/D resulting from solar wind reflection increases while the total solar wind thrust decreases. At the same time, however, thrust resulting from the acceleration through the screens of crosswind protons increases, maintaining total thrust constant at ever higher L/D (relative to the solar wind) levels. Once the crosswind velocity exceeds the solar wind velocity the solar wind becomes increasingly irrelevant and the dipole drive becomes a pure acceleration system, driving the incoming crosswind plasma behind it to produce thrust, As the speed of the spacecraft increases relative to the wind, it is necessary to increase the voltage in order maintain thrust/power ratio efficiency. For example, let's say we want to achieve 3000 km/s, or 0.01c. Then the kinetic energy equivalent voltage of the approaching protons would be 47 kV. So, to double this velocity we need to quadruple the total voltage, or add a sail voltage drop of 141 kV. The proton current would have a value of 480 nA/m$^2$, with a power of 68 mW/m$^2$. The thrust would be 15.1 nN/m$^2$, for a thrust to power ratio of 0.22 mN/kW.

It may be observed that since the necessary voltage increases as the square of the velocity, with power increasing with voltage but thrust increasing with velocity, the thrust to power ratio of the dipole drive decreases linearly with velocity. This puts limitations on the ultimate velocity achievable. For example, the most optimistic projections for advanced large space nuclear power system project a mass to power ratio of 1 kg/kW. If we accept this number, then, neglecting the mass of any payload or the dipole drive system itself, then the system described in the previous paragraph performing with a thrust to power ratio of 0.22 mN/kilowatt at 3000 km/s would have an acceleration of 0.00022 m/s$^2$, or 7 km/s per year. The average acceleration getting up to 3000 km/s would be twice this, so the spacecraft would take 214 years to reach this speed. During this time it would travel 1.07 light years. To reach 6000 km/s (0.02 c) starting from negligible velocity would require 857 years, during which time the spacecraft would travel 8.57 light years. The performance of such a system is shown in Table 2. Note 63,000 AU=1 light year. The performance shown assumes an advanced 1 kg/kWe power supply. If a more near-term power system with a higher mass/power is assumed, the time to reach any given distance increases as the square root of the mass/power ratio. So for example, if we assume a conservative near-term space nuclear power reactor with a mass/power ratio of 25 kg/kW, the time required to reach any given distance would increase by a factor of 5.

TABLE 2

Advanced Dipole Drive Performance for Ultra High-Speed Missions (1 kg/kW power)

| Final Speed | Final Voltage | Final Acceleration | Average Acceleration | Time | Distance |
|---|---|---|---|---|---|
| 250 km/s | 0.975 kilovolts | 84 km/s-yr | 164 km/s-yr | 1.52 yrs | 39.9 AU |
| 500 | 3.9 | 42 | 84 | 5.95 | 319 |
| 1000 | 15.6 | 21 | 42 | 23.8 | 2554 |
| 2000 | 62.4 | 10.5 | 21 | 95.2 | 20,432 |
| 3000 | 141 | 7 | 14 | 214 | 68,958 |
| 4000 | 250 | 5.25 | 10.5 | 381 | 163,458 |
| 5000 | 390 | 4.2 | 8.1 | 617 | 319,250 |
| 6000 | 564 | 3.5 | 7 | 857 | 551,664 |

It can be seen that advanced dipole drive spacecraft could be quite promising as a method of propulsion for missions to near interstellar space, for example voyages the Sun's gravitational focus at 550 AU. Unless much lighter power systems can be devised than currently anticipated however, they would still require centuries to reach the nearest stars. Power beaming may provide an answer. However such technologies are outside the scope of this paper.

If a spacecraft has been accelerated to interstellar class velocities, whether by means of the dipole drive or any alternative technology, the dipole drive provides a mans of deceleration without power (it could actually generate power) by creating drag against the relative plasma wind. This feat can also be done by a magnetic sail or an electric sail. However because it can also create lift as well as drag, the dipole drive offers much greater maneuverability during declaration as well as a means to freely maneuver within the destination solar system after arrival.

Dipole Drive Design Issues

Let us consider the case of a 2 kg microsatellite operating in LEO, with 5 W of available power to drive a dipole drive. (Note, a typical CubeSat has a mass of 1.3 kg. At 20 kg/kWe, a 5 W solar array should have a mass of about 0.1 kg.) If we operate it with a voltage of 16 Volts, it will produce 28.8 mN/kWe, or 0.144 mN thrust over all. It would have an acceleration of 0.000072 m/s$^2$. This would allow it to generate a □V of 2288 m/s in a year, sufficient to provide extensive station keeping propulsion, substantially change its inclination, or to raise it from a 400 km altitude orbit to a 700 km orbit in 1.6 months. To generate this much thrust at 400 km would require a scoop with a radius of 16 m, while doing so at 700 km would require a scoop with a radius of 58 m. Let us assume that the scoop is made of aluminum wire mesh, using wires 0.1 mm in diameter separated by distances of 2 m. Each square meter of mesh would thus have about 1 m length of wire. This needs to be doubled as there are two meshes, one positive and one negative. Therefore, a scoop with a radius of 16 m would have a mass of 32 grams. If the propulsion system were used simply for station keeping, inclination change, or deorbit functions at the 400 km altitude, that's all that would be needed. To operate at 700 km, a 116 gram scoop would be required. From these examples we can see that the use of the dipole drive to provide propulsion for microsatellites in LEO could potentially be quite attractive, as the modest scoop sizes required do not pose major deployment challenges.

Now let us consider a 100 kg interplanetary spacecraft in interplanetary space, operating with 500 W at a voltage of 2028 volts. From the discussion above it can be seen that this would generate about 2.54 mN of thrust in the direction of orbital motion. The scoop would need to have a radius of about 800 m. In interplanetary space, the Debye shielding length is ~60 m, and so a screen with a 20 m mesh would suffice. Such a screen would have a mass of about 8.5 kg, which would be well within the spacecraft mass budget. The 2.54 mN thrust would accelerate the spacecraft at 0.000025 m/s$^2$. It could thus impart a □V to the spacecraft of about 804 m/s per year. Higher accelerations could be provided by increasing the spacecraft power to mass ratio.

The deployment of large scoops composed of two parallel, oppositely charged meshes poses operational and design issues. Prominent among these is the fact that the two opposite charged screens will attract each other. However the total force involved is not that large. For example, let us consider a configuration consisting to two sails of 500 m radius separated by 500 m with a 2 kV potential difference. Then the electric field between them will be 4 volts/m. The area of each screen will be 785,400 m$^2$. From basic electrostatics we have EA=Q/□□□ so Q, the charge of each screen will be given by Q=(4)(785,400)(8.85 e-12) =0.000028 coulombs. The electrostatic force on each sail is given by F=QE, so the total electrostatic force of each sail will be 0.1 mN. This is about a tenth the thrust force exerted by the screens themselves. Nevertheless, as small as they are, both of these forces will need to be negated. This can be done either with structural supports or by rotating the spacecraft and using artificial gravity to hold the sails out perpendicular to the axis of rotation. An alternative is to use the self-repulsion of the charge of each sail to help hold it out flat. In such a configuration two sails held separate from each other by a boom attached to their centers could be expected to curve towards each other at their edges until the stiffening self-repulsive force on each sail from its own charge balanced the bending forces exerted by the spacecraft's acceleration, the push of the wind, and the attractive force of the opposite sail.

One way to avoid such issues would be to design the system as a literal dipole, with a rod holding a positive charge at its end to the front of the spacecraft, and a rod holding the negative charge pointing to the rear of the spacecraft. Seen from a distance, such a configuration is electrically neutral and would exert negligible field. However, in the zone between the charges, there is a strong field from one pole to the other. Particles entering this field along the rod center lines would experience the full voltage drop. Particles entering the field at some distance from this central axis would experience a lower voltage drop. The overall functional voltage of such a system, from the point of view of power consumption and exhaust velocity, would be an average over many particles entering the dipole field at all distances from its axis. This is obviously a more complex configuration to analyze than that of the two parallel screens discussed so far, but it may be much simpler to implement in practice on an actual spacecraft.

A critical issue is the material to be used to create the dipole drive. In his original paper on the classic electric sail, Pekka Janhunen suggested using copper wires with diameters between 2.5 and 10 microns. This is not an optimal choice, as copper has a much lower strength to mass ratio than aluminum, and such thin strands would be quite delicate. For this reason, in the above examples we specified aluminum wire with 100-micron diameters. A potentially much better option, however, might be to use aluminized spectra, as spectra has about 10 times the yield strength of aluminum, and roughly ⅓ the density (Aluminum 40,000 psi, 2700 kg/m$^3$, compared to Spectra 400,000 psi, 970 kg/m$^3$.). Spectra strands with 100-micron diameters and a coating of 1 micron of aluminum could thus be a far superior material for dipole drive system, and classic electric sails as well. An issue however is Spectra's low melting point of 147 C. Kevlar, however, with a yield strength of 200,000 psi, a density of 1230 kg/m$^3$, and a melting point of 500 C could provide a good compromise. Still another promising option might be aluminized strands made of high strength carbon fiber, such as the T1000G (924,000 psi, 1800 kg/m$^3$) produced by Toray Carbon Fibers America.

As with the electric sail, the dipole drive must deal with the issue of sail charge neutralization caused by the attraction of ambient electrons to the sail's positive screen. In reference 4, P. Janhunen showed that the total such current that an electric sail would need to dispose of would be modest, entailing small power requirements if ejected from the spacecraft by a high voltage electron gun. In the case of the dipole drive, the current would be still smaller because the spacecraft has no net charge. In addition electrons acquired by the positive screen could be disposed of by using the power source to transport them to the negative screen. Alternatively, if an electron gun were used, its required voltage would be less than that needed by an electric sail because external to the screens, the dipole drive's field is much weaker and falls off much more quickly. For these reasons, the issue of sail charge neutralization on the dipole drive should be quite manageable.

Because the dipole drive does not interact with plasma outside of the zone between its screens, the issue of Debye shielding of its screen system to outside charges is not a concern. Debye shielding of its individual wires within screens can be dealt with by means of adequately tight wire spacing. As shown by Janhunen such spacing may be quite liberal (~60 m in near Earth interplanetary space), enabling sails with very low mass to area ratios.

The dipole drive is a promising new technological concept that offers unique advantages for space propulsion. Requiring no propellant, it can be used to thrust in any direction, and both accelerate and decelerate spacecraft operating within planetary magnetospheres, in interplanetary space, and interstellar space. Unlike magnetic sails and electric sails, it can generate both lift and drag, and its maximum velocity is not limited by the speed of the solar wind. Near-term dipole drives could be used to provide a reliable, low cost, low mass technology to enable propellantless movement of spacecraft from one orbit to another, to provide station keeping propulsion, or to deorbit satellites, as required. Then dipole drive could also be used as a method of capturing interplanetary spacecraft into orbit around destination planets, or of lowering the orbits of spacecraft captured into initial elliptical orbits using high thrust propulsion. The latter application is particularly interesting, because it could enable a small lightweight lunar ascent vehicle to carry astronauts home from the Moon by launching directly from the lunar surface to trans-Earth injection and then subsequently lower itself to LEO to rendezvous with a space station or reentry capsule spacecraft without further use of propellant. Such an approach could potentially reduce the mass of a manned lunar mission to within the launch capacity of a single Falcon Heavy. Because it needs no propellant, the dipole drive offers the unique advantage of being able to provide its propulsion service to any spacecraft indefinitely. While the dipole drive is most attractive in orbital space whether ambient plasma is thickest, it can be used in interplanetary space and even enable interstellar missions as well, becoming more attractive for such applications as ancillary technologies, such as power generation evolve.

There are many technical issues that need to be resolved before practical dipole drive spacecraft can become a reality. However both the theory of dipole drive operation and it potential benefits are clear. Work should therefore begin to advance it to flight status. The stars are worth the effort.

REFERENCES

1. Jerome Wright (1992), *Space Sailing*, Gordon and Breach Science Publishers
2. D. G. Andrews and R. Zubrin, "Magnetic Sails and Interstellar Travel", IAF-88-553, 1988
3. R. Zubrin and D. G Andrews, "Magnetic Sails and Interplanetary Travel," AIAA-89-2441, AIAA/ASME Joint Propulsion Conference, Monterey, Calif. July 1989. Published in *Journal of Spacecraft and Rockets*, April 1991.
4. Pekka Janhunen, "Electric Sail for Spacecraft Propulsion," J. Propulsion, Vol. 20, No. 4: Technical Notes, pp763-764. 2004.
5. Cosmo, M. L., and Lorenzini, E. C., *Tethers in Space Handbook*, NASA Marshall Space Flight Center, 1997
6. D. Hambling, "The Impossible EM Drive is Heading to Space," Popular Mechanics, Sep. 2, 2016.
7. "Debye_Length," Plasma Universe.com, https://www.plasma-universe.com/Debye_length accessed Feb. 18, 2018.

What is claimed is:

1. A dipole drive spacecraft system for space propulsion configured to generate a thrust with an ambient space plasma without an onboard propellant comprising:

a power supply which is a nuclear generator or a solar power system;

an electron gun;

two parallel charged screens, including a positive charged screen and a negative charged screen;

wherein said power supply and said electron gun are configured to maintain a voltage potential difference between said two parallel charged screens, with said voltage potential difference being between 1 volt and 564 kilovolts, or wherein said voltage potential difference being no greater than 3 times a kinetic voltage of the ambient space plasma, to thereby create an electric field between the two parallel charged screens, wherein the dipole drive spacecraft system is configured such that when an outward facing normal to the positive charged screen is oriented opposite to a direction of a velocity of the ambient space plasma, the dipole drive spacecraft system accelerates the ambient space plasma thereby generating the thrust along the outward facing normal to the positive charged screen, wherein the dipole drive spacecraft system is configured such that when an outward facing normal to the negative charged screen is oriented opposite to the direction of the velocity of the ambient space plasma, the dipole drive spacecraft system decelerates the ambient space plasma thereby generating a drag along the outward facing normal to the negative charged screen, and wherein the dipole drive spacecraft system is configured such that when the outward facing normal to the negative charged screen is oriented oblique to the direction of the velocity of the ambient space plasma, the dipole drive spacecraft system reflects the ambient space plasma at an angle of reflection equal to an angle of incidence of the velocity of the ambient space plasma thereby generating a reaction force on the dipole drive spacecraft system equal and opposite to the force applied to the ambient space plasma when the dipole drive spacecraft system reflects the ambient space plasma at the angle of reflection.

2. The dipole drive spacecraft system of claim 1 wherein the two parallel charged screens comprise metal wire screens.

3. The dipole drive spacecraft system of claim 1 wherein the two parallel charged screens comprise metal coated high strength fibers.

4. The dipole drive spacecraft system of claim 1 wherein the two parallel charged screens comprise carbon fibers, with or without a metal coating.

5. The dipole drive spacecraft system of claim 1 comprising booms to deploy said positive charged screen and said negative charged screen.

6. A process for propulsion in a dipole drive spacecraft using an ambient space plasma comprising:

providing a dipole drive spacecraft system configured to generate a thrust with the ambient space plasma without an onboard propellant, wherein the dipole drive spacecraft comprises:

a power supply which is a nuclear generator or a solar power system;

an electron gun; and two parallel charged screens, including a positive charged screen and a negative charged screen; and maintaining a voltage potential difference between said two parallel charged screens with said power supply and said electron gun, with said voltage potential difference being between 1 volt and 564 kilovolts or said voltage potential difference being no greater than 3 times a kinetic voltage of the ambient space plasma; and performing at least one of:

orienting an outward facing normal to the positive charged screen opposite a direction of a velocity of the ambient space plasma thereby accelerating the ambient space plasma thereby generating the thrust along the outward facing normal to the positive charged screen, orienting an outward facing normal to the negative charged screen opposite the direction of the velocity of the ambient space plasma thereby decelerating the ambient space plasma thereby generating a drag along the outward facing normal to the negative charged screen, and orienting the outward facing normal to the negative charged screen oblique to the direction of the velocity of the ambient space plasma so that the dipole drive spacecraft system reflects the ambient space plasma at an angle of reflection equal to an angle of incidence of the velocity of the ambient space plasma thereby generating a reaction force on the dipole drive spacecraft equal and opposite to a force applied to the ambient space plasma when the dipole drive spacecraft system reflects the ambient space plasma at the angle of reflection.

7. The process of claim 6 further comprising, generating power with the two parallel charged screens by creating the drag against the ambient space plasma.

8. The process of claim 6 further comprising, providing a loop of current carrying wire around a respective perimeter of each screen of the two parallel charged screens to deploy the two parallel charged screens by a magnetic pressure exerted by the loop of current carrying wire.

9. The process of claim 6, further comprising charging the two parallel charged screens so as to deploy each screen of the two parallel charged screens via electrostatic self-repulsion.

10. The process of claim 6, further comprising orienting the two parallel charged screens so as to raise or lower or change an inclination of an orbit of the dipole drive spacecraft.

11. The process of claim 6, further comprising orienting the two parallel charged screens so as to maneuver the dipole drive spacecraft in interplanetary space.

12. The process of claim 6, further comprising orienting the two parallel charged screens so as to accelerate the dipole drive spacecraft to very high velocities for travel to destinations beyond the solar system.

* * * * *